(12) United States Patent
Shah et al.

(10) Patent No.: US 11,772,819 B2
(45) Date of Patent: Oct. 3, 2023

(54) METHOD AND SYSTEM TO ASCERTAIN LOCATION OF DRONE BOX FOR LANDING AND CHARGING DRONES

(71) Applicant: Sagar Defence Engineering Private Limited, Mumbai (IN)

(72) Inventors: Chirag Shah, Mumbai (IN); Saurabh Patil, Mumbai (IN); Mridul Babbar, Mumbai (IN); Lakshay Dang, Mumbai (IN)

( * ) Notice: Subject to any disclaimer, the term of this patent is extended or adjusted under 35 U.S.C. 154(b) by 0 days.

(21) Appl. No.: 17/755,152

(22) PCT Filed: Sep. 28, 2020

(86) PCT No.: PCT/IN2020/050834
§ 371 (c)(1),
(2) Date: Jun. 10, 2022

(87) PCT Pub. No.: WO2021/234722
PCT Pub. Date: Nov. 25, 2021

(65) Prior Publication Data
US 2022/0380063 A1  Dec. 1, 2022

(30) Foreign Application Priority Data

May 18, 2020 (IN) .............................. 202021020842

(51) Int. Cl.
*B64F 1/36* (2017.01)
*B60L 53/60* (2019.01)
(Continued)

(52) U.S. Cl.
CPC .............. *B64F 1/362* (2013.01); *B60L 53/60* (2019.02); *B64C 29/0008* (2013.01);
(Continued)

(58) Field of Classification Search
CPC ....... B64U 80/25; B64F 1/222; B60L 2200/10
See application file for complete search history.

(56) References Cited

U.S. PATENT DOCUMENTS 10,418,830 B1 *  9/2019  Parodi ..................... G01T 3/008
10,467,685 B1 * 11/2019  Brisson .............. G06Q 30/0645
(Continued)

FOREIGN PATENT DOCUMENTS

KR    20170017517       2/2017
KR    20180002358       8/2018
(Continued)

*Primary Examiner* — Christopher D Hutchens
(74) *Attorney, Agent, or Firm* — Ifica D. Mehra (57) ABSTRACT

Method and system to ascertain location of drone box for landing and charging drones comprising at least a drone box having a drone platform with a plurality of limiting boundaries, divided into number of sensor zones that are mechanically contiguous and electrically separated by an insulated separator of insulation width, each sensor zone having an identification coordinates, each drone having a plurality of ground interfaces, each having a unique address code, each ground interface has a charging terminal at a far end, each charging terminal having an interlocked switchable electricity polarity. The identification coordinates of the activated sensor zones are communicable to a second drone so that the second drone knows where NOT to land on the drone box, Such communication enables a third and subsequent drone to ascertain whether the identified drone box is suitable and available for landing.

18 Claims, 11 Drawing Sheets

(51) Int. Cl.
  *B64C 29/00* (2006.01)
  *B64C 39/02* (2023.01)
  *B64F 1/22* (2006.01)
  *B64U 70/00* (2023.01)
  *B64U 101/20* (2023.01)

(52) U.S. Cl.
  CPC ......... *B64C 39/024* (2013.01); *B60L 2200/10* (2013.01); *B64F 1/222* (2013.01); *B64U 70/00* (2023.01); *B64U 2101/20* (2023.01)

(56) References Cited

U.S. PATENT DOCUMENTS

| | | | |
|---|---|---|---|
| 2006/0071155 A1* | 4/2006 | Chen | E05F 15/43 250/221 |
| 2015/0097530 A1* | 4/2015 | Scarlatti | H02J 7/00 320/109 |
| 2018/0237161 A1* | 8/2018 | Minnick | B64C 39/024 |
| 2019/0002127 A1* | 1/2019 | Straus | G08G 5/0091 |
| 2019/0002128 A1* | 1/2019 | Raz | B64C 39/024 |
| 2019/0070995 A1* | 3/2019 | Cantrell | B60P 3/007 |
| 2019/0102730 A1 | 4/2019 | Giorgi et al. | |
| 2019/0270526 A1* | 9/2019 | Hehn | B64U 80/70 |
| 2019/0315463 A1* | 10/2019 | Chen | G05D 23/1917 |
| 2022/0315248 A1* | 10/2022 | Castellano Aldave | B60L 5/36 |

FOREIGN PATENT DOCUMENTS

| | | |
|---|---|---|
| KR | 20190087910 | 7/2019 |
| WO | 2018078588 | 5/2018 |
| WO | 2018227576 | 12/2018 |
| WO | 2019125596 | 6/2019 |
| WO | 2019151947 | 8/2019 |

* cited by examiner

Section A A

METHOD AND SYSTEM TO ASCERTAIN LOCATION OF DRONE BOX FOR LANDING AND CHARGING DRONES

FIELD OF THE INVENTION

The present invention relates to unmanned aerial vehicles which are commonly known as drones, particularly to autonomous aerial vehicles, and more particularly to landing and charging of autonomous aerial vehicles or drones.

BACKGROUND OF THE INVENTION

Drones, the unmanned aerial vehicles are increasingly getting involved in functions of modern life. Initial drones were assisted in take-off and landing however they are rapidly becoming technologically advanced in terms of managing newer functions of self-management. Unassisted landing of unmanned aerial vehicles now plays a vital role in autonomous as well as semi-autonomous devices. Such landing may be complex in environment with weak or no navigational signals. It is a further challenge to land on moving platforms. A precision landing paves way for further activities like charging batteries of drone, protected parking and safety of attachments from environment and attack.

KR1020170017517 discloses a smart drone house to charge and manage drones, and a method of operating the same, and comprises a step of guiding at least one drone to land with a landing guidance system to enable the drone to land on a landing unit when the drone approaches the drone house accommodating a plurality of drones; a step of preparing landing of the drone as a door of the drone house is opened; a step of storing the drone by closing the door of the drone house after confirming landing of the drone on the landing unit; a step of storing a safety state, a charged state, and a flight record of the drone using real time data communications and monitoring the same in real time; a step of checking the charged state of the drone by real time monitoring and charging the drone using a wireless charging system installed in the landing unit; a step of approving a flight after checking a safety state and a changed state of the drone by real time monitoring if a flight of the drone is required; a step of preparing a take-off of the drone as the door of the drone house is opened; and a step of closing the door of the drone house after confirming the take-off of the drone.

WO/2018/078588 discloses a drone charging station configured to receive at least one drone, the docking station including an elongated docking shaft sized to engage with the at least one drone, the docking shaft having a drone entrance end and a drone exit end opposite the drone entrance end; and a drone guiding thread helically disposed along the elongated docking shaft, the drone guiding thread configured to engage with a corresponding guiding region on the at least one drone to allow the at least drone to move along the drone guiding thread from the drone entrance end to the drone exit end.

KR1020190087910 discloses a drone charging station with multiple charging configurations of a drone.

US20190102730 discloses techniques that facilitate drone delivery and nascent landing, particularly with respect to home and commercial package delivery, while WO/2018/227576 discloses a method and system for detecting ground shape, method for drone landing, and drone, while there is no disclosure about charging.

WO/2019/125596A1 discloses a drone landing platform with charging capability and retractable cover, with at least one leg to elevate the landing surface.

Innumerable possibilities of a UAV landing orientations, situations and conditions exist, creating further challenges due to multiple drones landing and safe charging. The present invention bridges a big technological gap.

OBJECTIVE

The objective is to invent an unmanned aerial vehicle that is capable of unassisted precise self-landing.

Another objective is to invent an unmanned aerial vehicle that is capable of micro-correction in self-landing.

Yet another objective is to invent a landing station for an unmanned aerial vehicle.

Yet another objective is to invent a method of coordination between an unmanned aerial vehicle and a corresponding landing station.

Yet another objective is to invent a system of landing and un-assisted charging an unmanned aerial vehicle on a corresponding landing station.

Yet another objective is to protect the unmanned aerial vehicle from environment and attack while in landed condition.

Yet another objective is to protect the unmanned aerial vehicle from environment and attack while in charging condition.

Yet another objective is to initiate voluntary landing of the unmanned aerial vehicle based on balance energy vis a vis nearest corresponding landing station.

Yet another objective is to charge batteries of landed drone(s).

Yet another objective is to manage landing and charging of multiple drones.

SUMMARY OF INVENTION

The present invention is a system comprising one or more drone box and one or more drones. The drone box and the drone mutually communicate through a proprietary network or through GPS, WIFI and or commercially available networks.

Each drone box has a drone platform. The drone platform has a plurality of limiting boundaries. The limiting boundaries are created optically, magnetically or such non-physical means that senses if any physical object is obstructing a line of sight radiation of a source transmitter and a source receiver. The source transmitter and the source receiver are disposed along the limiting boundaries.

The drone platform is divided into number of sensor zones. The sensor zones are mechanically contiguous and electrically separated by an insulated separator of insulation width. Each sensor zone has an identification coordinates.

The drone box has a plurality of platform covers. The platform covers are auto operable after meeting prescribed safety criterion for the plurality of drones.

At least two mounting dispositions are provided at a lower end of the drone box. Each mounting disposition is manually adjustable in a longitudinal direction and has a flexible cushion at its free end capable of adjusting an orientation commensurate with a surface of disposition. The flexible cushion is pneumatic, that is vacuum assisted, and or magnetic. The flexible cushion is removably fixable on the surface of disposition.

Each drone has a plurality of ground interfaces. The ground interfaces facilitate landing, parking and or charging corresponding drone. Each ground interface of each drone has a unique address code. Each ground interface has a charging terminal at a far end. Each charging terminal has an interlocked switchable electricity polarity namely POSITIVE (+ve) or NEGATIVE (−ve) or NEUTRAL (N). The interlocked switchable polarity is switched by a Programmable Controller situated in the drone. Every landing drone has a default polarity of positive (+ve) and negative (−ve) on its two charging terminals. A minimum terminal dimension of the charging terminal is such that a minimum contact area is ensured when an axis of the ground interface of the drone exactly coincides with a center of intersection of the adjacent sensor zones, since an upper surface of the drone platform is a level surface.

The drone, while air borne, ascertains and registers a precise position of the drone platform of the drone box in the vicinity by receiving its latitude and longitude from a global positioning system. While in a landing mode, the drone auto pilots its trajectory from its own dynamic position to the latitude and longitude of the landing platform. The drone vertically lands within a diameter less than twice its own envelope diameter.

The drone, while air borne, ascertains and registers a precise position of the landing platform of the drone box in the vicinity by receiving its latitude and longitude from a global positioning system. While in a landing mode, the drone auto pilots its trajectory, in real time, from its own dynamic position to the dynamically varying latitude and longitude of a moving drone platform, for example, when mounted on a car.

When any drone lands on a drone box, an algorithm involving the unique address code of the ground interface and the identification coordinates of the sensor zones ascertains whether the drone has landed safely that is clear of all limiting boundaries, or the drone has landed unsafely. In the event the drone has landed unsafely, the drone takes off and attempt another landing. In the event of a pre-decided numbers of unsuccessful attempts, a number of back up actions are initiated including prevention of movement of the platform covers, alarm/signal for manual intervention.

As a first drone lands safely, the sensor zones sense the default polarity of Positive (+ve) and Negative (−ve) of the ground interfaces of the first drone and corresponding sensor zones are activated with matching polarity so as to commence charging of batteries of the drone.

The identification coordinates of the activated sensor zones are communicable to a second drone so that the second drone knows where NOT to land on the drone box. Such communication enables a third and subsequent drone to ascertain whether the identified drone box is suitable and available for landing.

Only sensor zones occupied by a plurality of drones are activated so as to have highest safety and avoid loss of charge.

In the event that may arise due to a defect or localized obstruction, if any and all the sensor zones fail to sense the default polarity of the Positive (+ve) and or the Negative (−ve) of the ground interfaces in a prescribed time, the drone switches the electrical polarity to another charging terminal.

A charging arrangement protects the system against over voltage, over current, reverse polarity and leakage current. Once the drone has safely landed, the drone is protected by the platform covers. The drone covers are slidable or openable. The drone covers are integrated on the drone box or separately disposed.

BRIEF DESCRIPTION OF DRAWINGS

FIG. 5A is a partial top view of a drone platform, while

DETAILED DESCRIPTION OF INVENTION

The present invention shall now be described with the help of accompanying drawings. It is to be expressly understood that various terms and details are to explain the inventive concept and should not be construed to limit the invention in any way whatsoever.

Figure 1A:
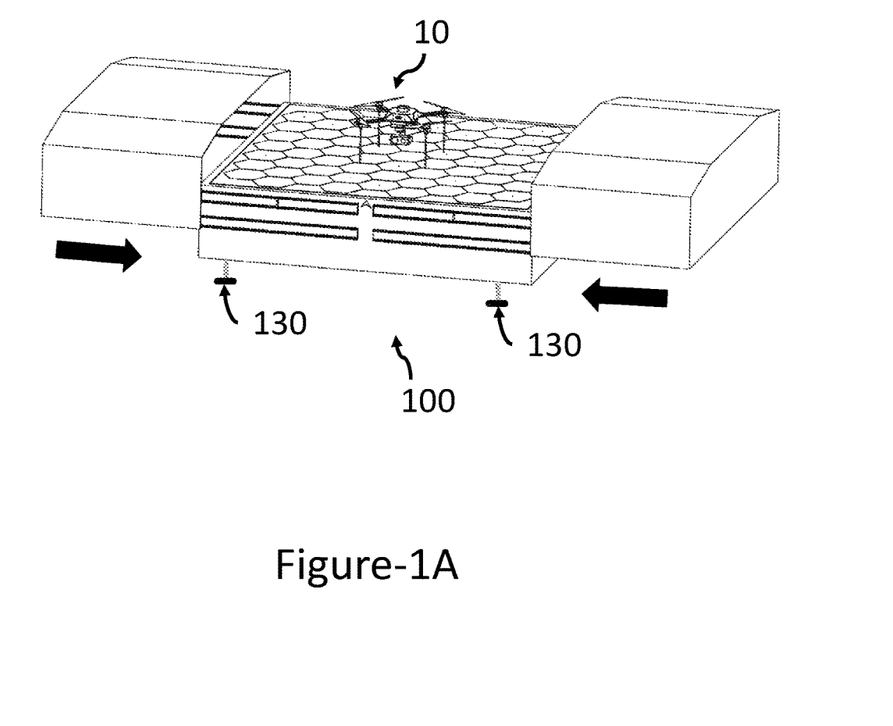
FIG. 1A is a perspective view of a drone box with a drone landed thereon.

The present invention is a system comprising one or more drone box (100) and one or more drones (10). The drone box (100) and the drone (10) mutually communicate through a proprietary network or through GPS, WIFI and or commercially available networks. FIG. 1A.

Each drone box (100) has a drone platform (110). The drone platform (110) has a plurality of limiting boundaries (113).

Figure 1B:
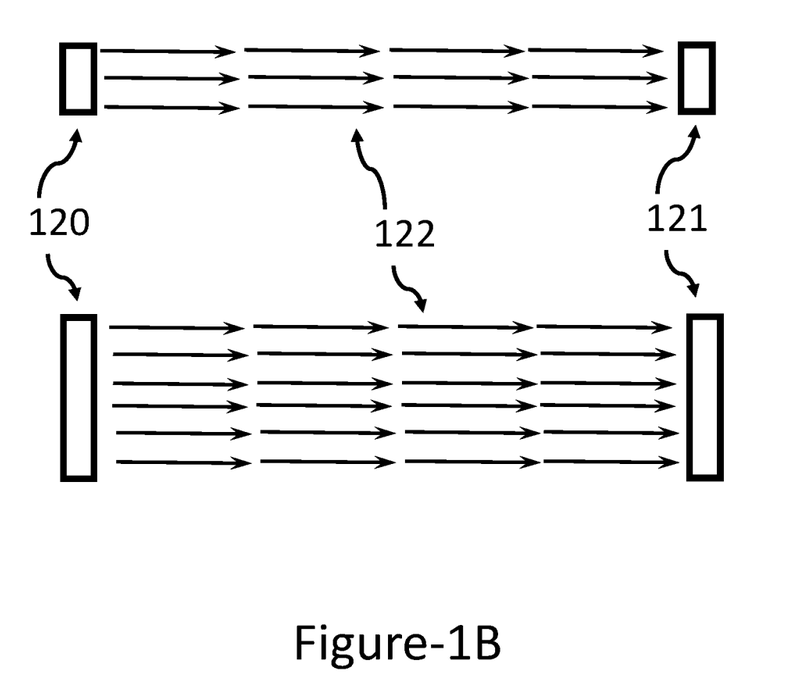
FIG. 1B is a top view and a front view of a line of sight radiation along with sources.
Figure 2:
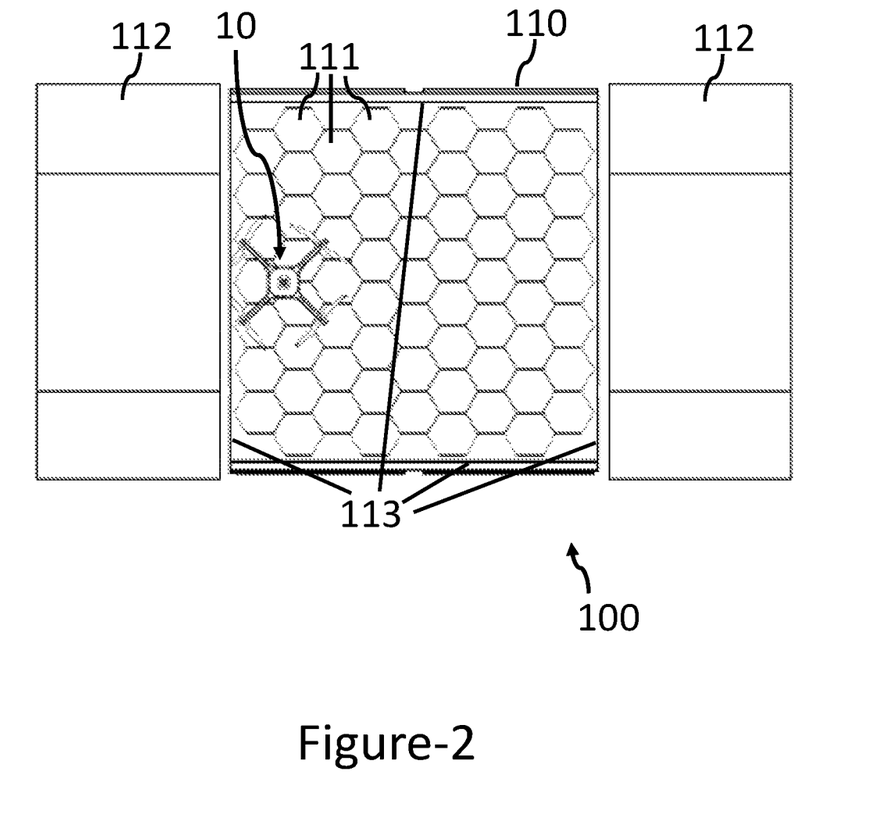
FIG. 2 is a top view of the drone box with the drone landed thereon in an unsafe location.

FIG. 1B, 2 the limiting boundaries (113) are created optically, magnetically or such non-physical means that senses if any physical object is obstructing a line-of-sight radiation (122) of a source transmitter (120) and a source receiver (121). The source transmitter (121) and the source receiver (121) are disposed along the limiting boundaries (113). The drone platform (110) is divided into number of sensor zones (111). The sensor zones (111) are mechanically contiguous and electrically separated by an insulated separator (114) of insulation width (115). Each sensor zone (111) has an identification coordinates.

FIG. 2, the drone box (100) has a plurality of platform covers (112). The platform covers (112) are auto operable after meeting prescribed safety criterion for the plurality of drones (10).

Figure 3:
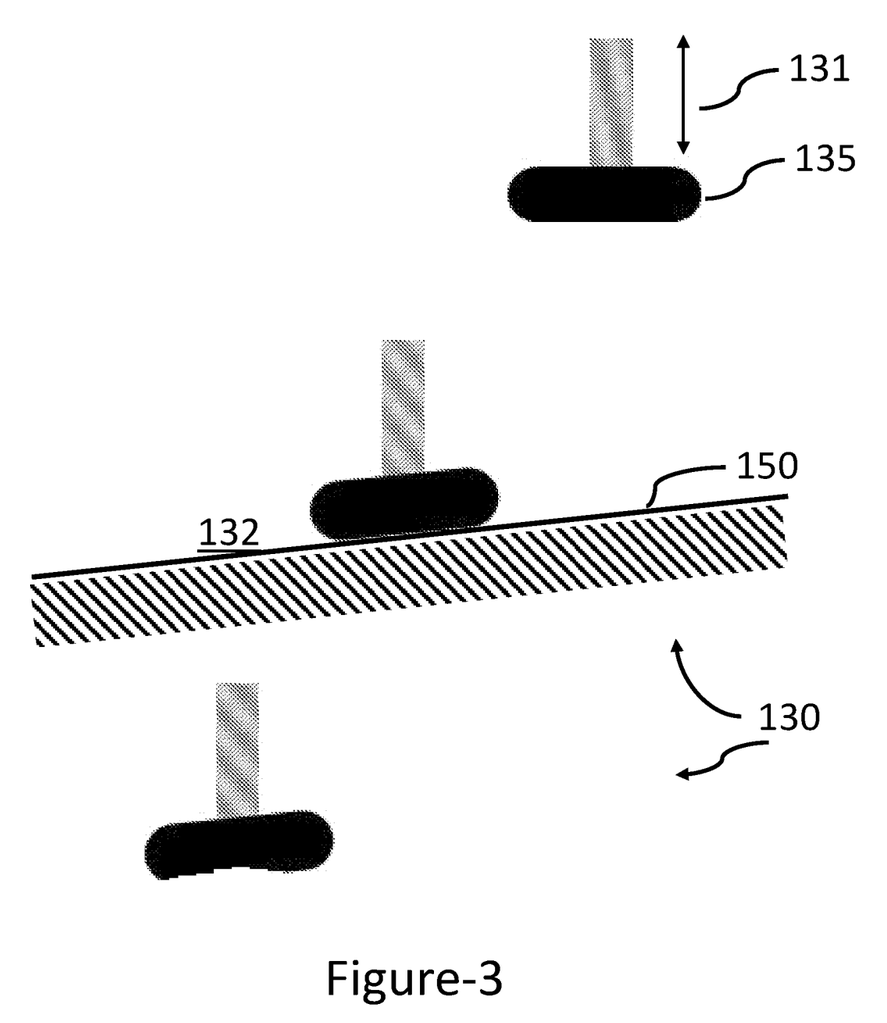
FIG. 3 are various views of a mounting disposition.

FIG. 3, a plurality of mounting dispositions (130) are provided at a lower end of the drone box (100). Each mounting disposition (130) is manually adjustable in a longitudinal direction (131) and has a flexible cushion (135) at its free end (132) capable of adjusting an orientation commensurate with a surface of disposition (150). The flexible cushion (135) is pneumatic, that is vacuum assisted, and or magnetic. The flexible cushion (135) and is removably fixable on the surface of disposition (150).

Figure 4:
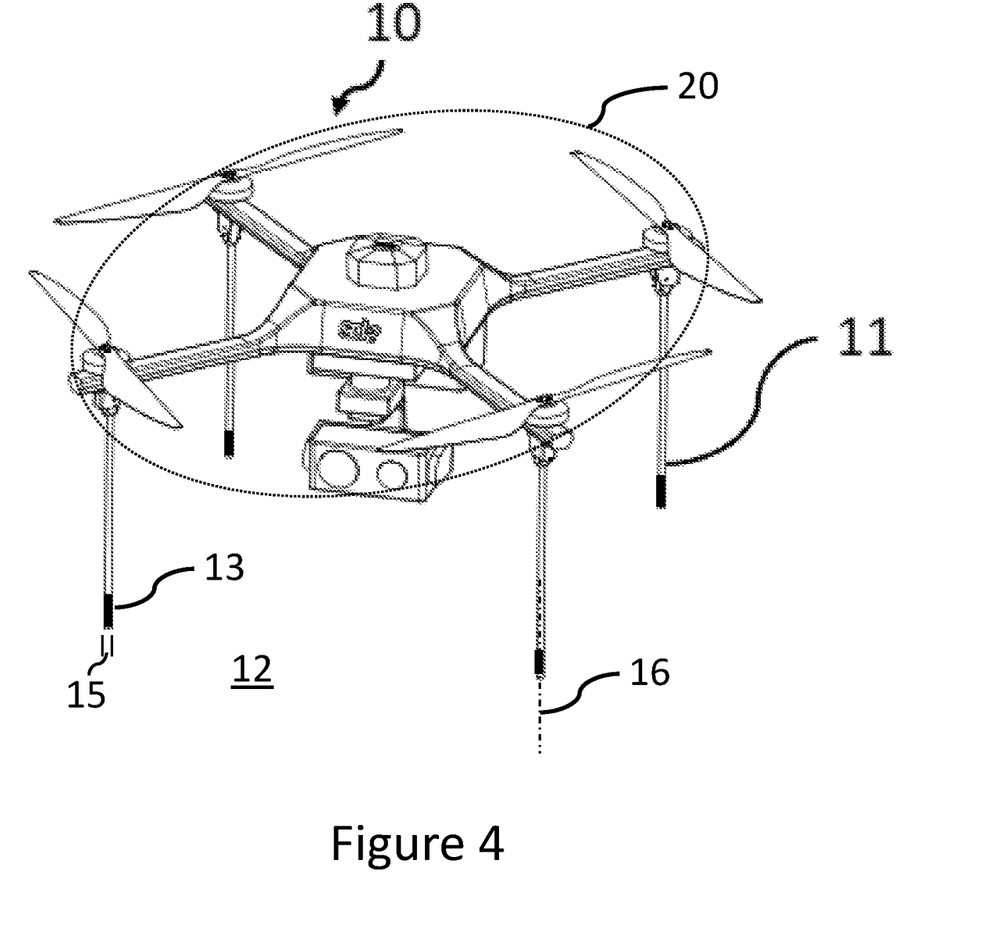
FIG. 4 is a perspective view of the drone.

FIG. 4, each drone (10) has a plurality of ground interfaces (11). The ground interfaces (11) facilitate landing, parking and or charging corresponding drone (10). Each ground interface (11) of each drone (10) has a unique address code. Each ground interface (11) has a charging terminal (13) at a far end (12). Each charging terminal (13) has an interlocked switchable electricity polarity namely POSITIVE (+ve) or NEGATIVE (−ve) or NEUTRAL (N).

Figure 5A:
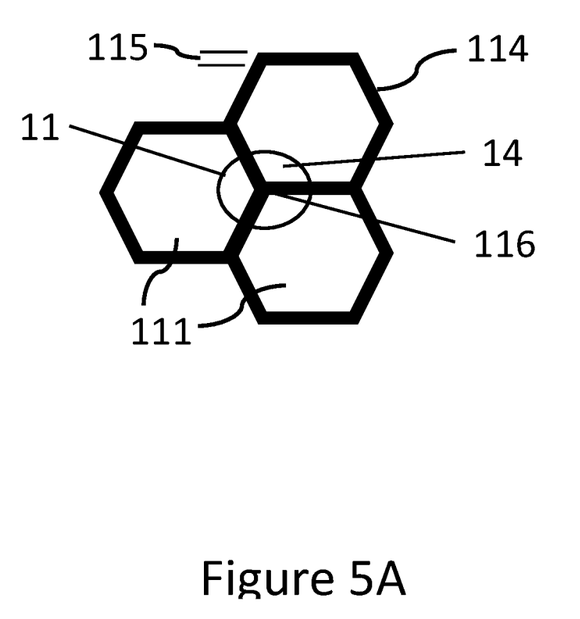
Figure 5B:
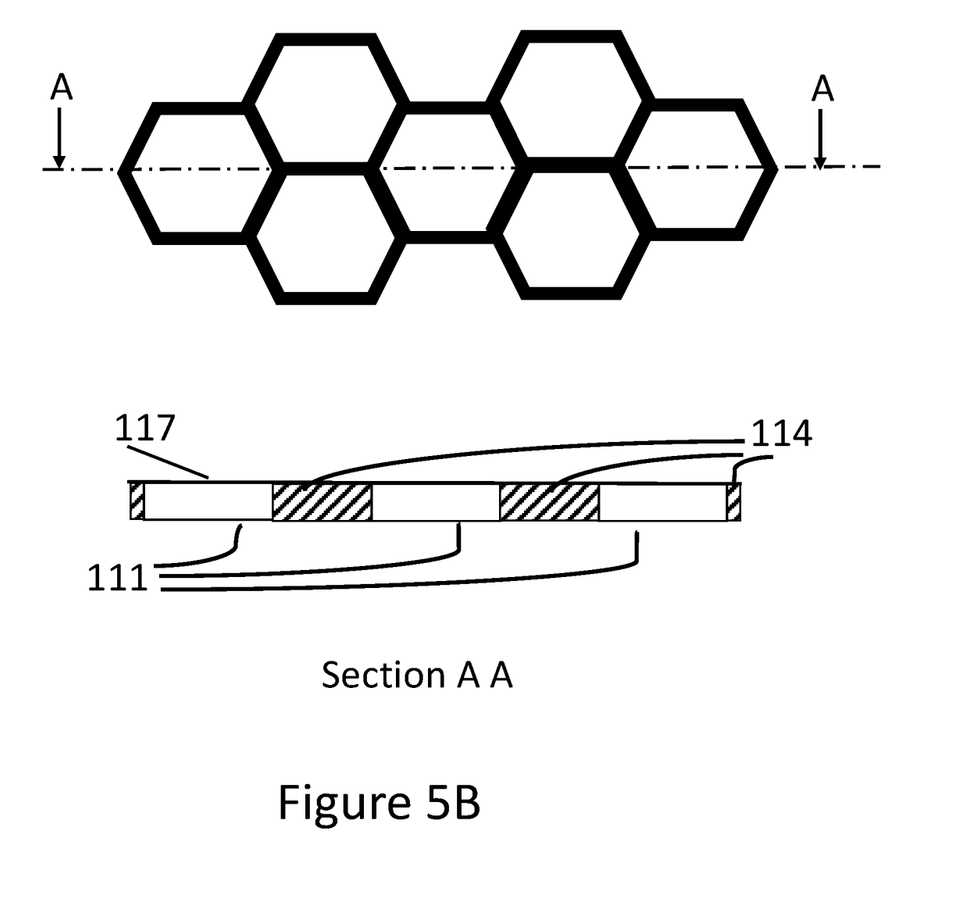
FIG. 5B is a partial top view and a sectional front view of the drone platform.

The interlock switchable polarity is switched by a Programmable Controller (15) situated in the drone (10). Every landing drone (10) has a default polarity of positive (+ve) and negative (−ve) on its two charging terminals (13). FIG. 5A, a minimum terminal dimension (15) of the charging terminal (13) is such that a minimum contact area (14) is ensured when an axis (16) of the ground interface (11) of the drone (10) exactly coincides with a center of intersection (116) of the adjacent sensor zones (111), since an upper surface (117) of the drone platform (110) is a level surface.

The drone (10), while air borne, ascertains and registers a precise position of the drone platform (110) of the drone box (100) in the vicinity by receiving its latitude and longitude from a global positioning system. While in a landing mode, the drone (10) auto pilots its trajectory from its own dynamic position to the latitude and longitude of the landing platform. The drone (10) vertically lands within a diameter less than twice its own envelope diameter (20).

Figure 9:
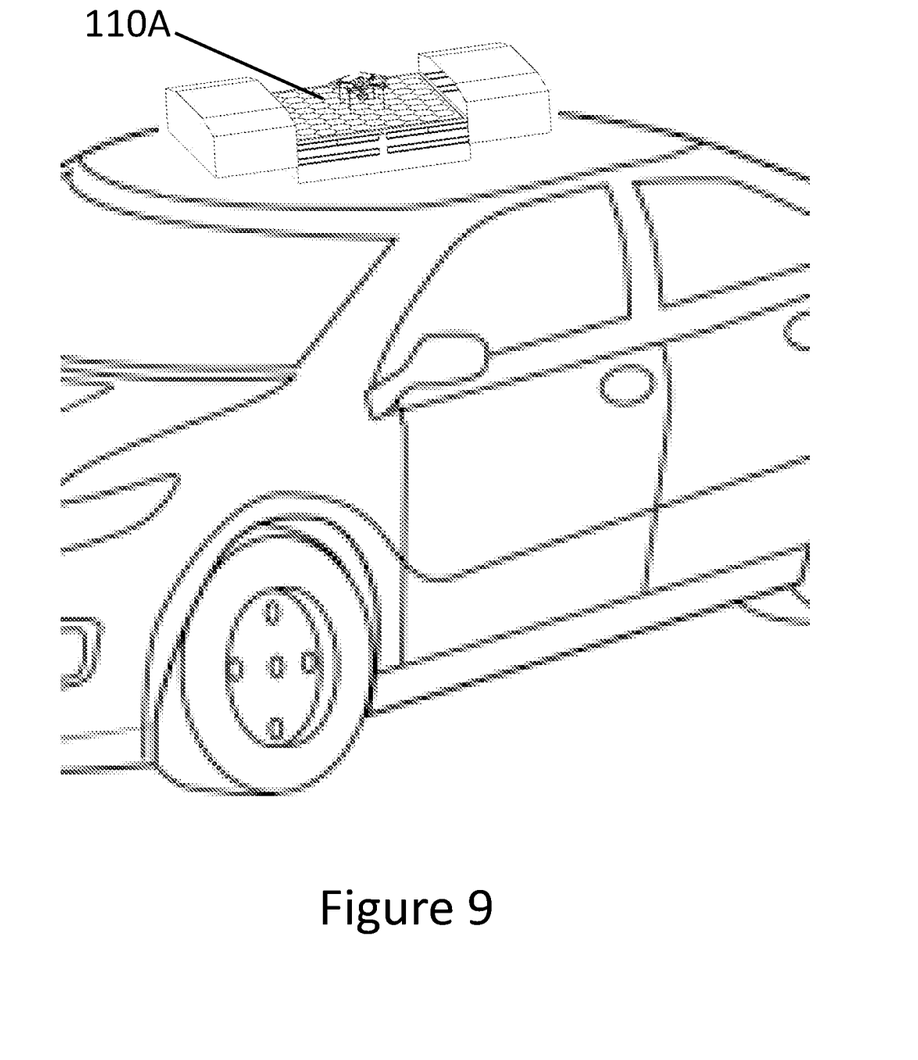
FIG. 9 is a perspective view of the drone box mounted on a moving vehicle.

The drone (10), while air borne, ascertains and registers a precise position of the landing platform of the drone box in the vicinity by receiving its latitude and longitude from a global positioning system. While in a landing mode, the drone (10) auto pilots its trajectory, in real time, from its own dynamic position to the dynamically varying latitude and longitude of a moving drone platform (110A), for example, when mounted on a car, FIG. 9.

Figure 6:
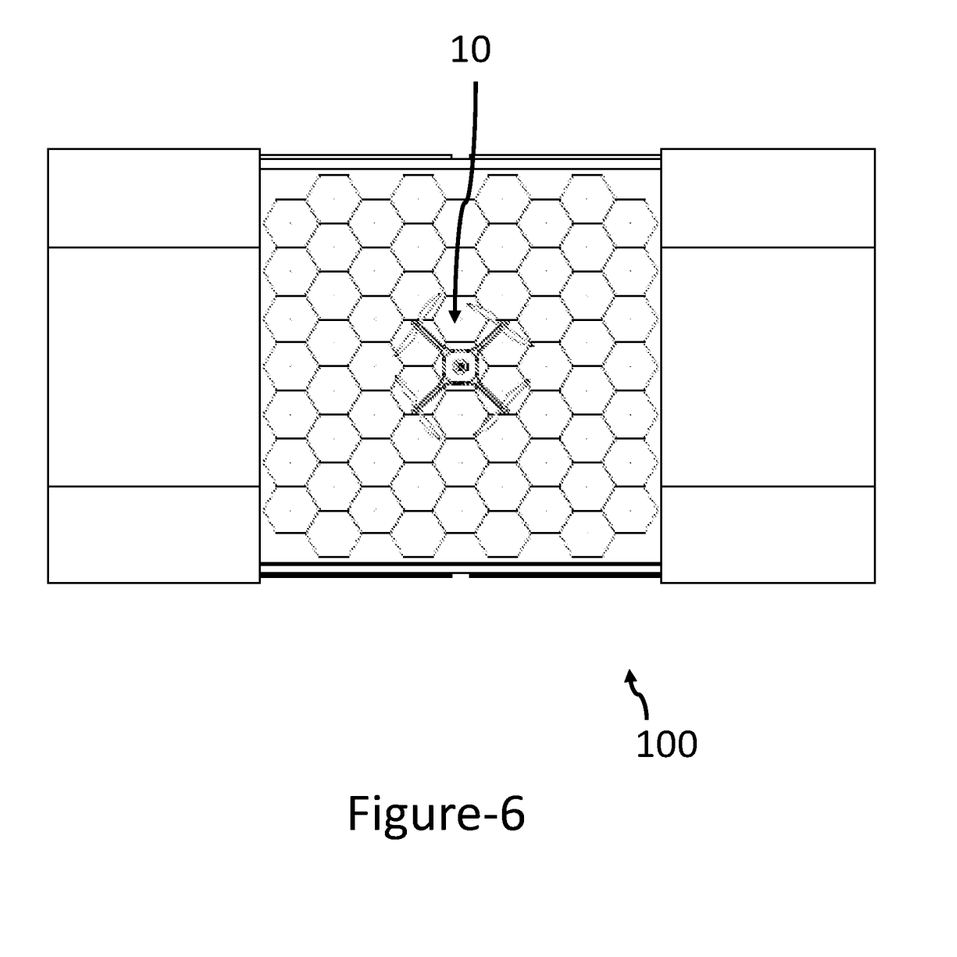
FIG. 6 is a top view of the drone box with the drone landed thereon on a safe location.
Figure 7:
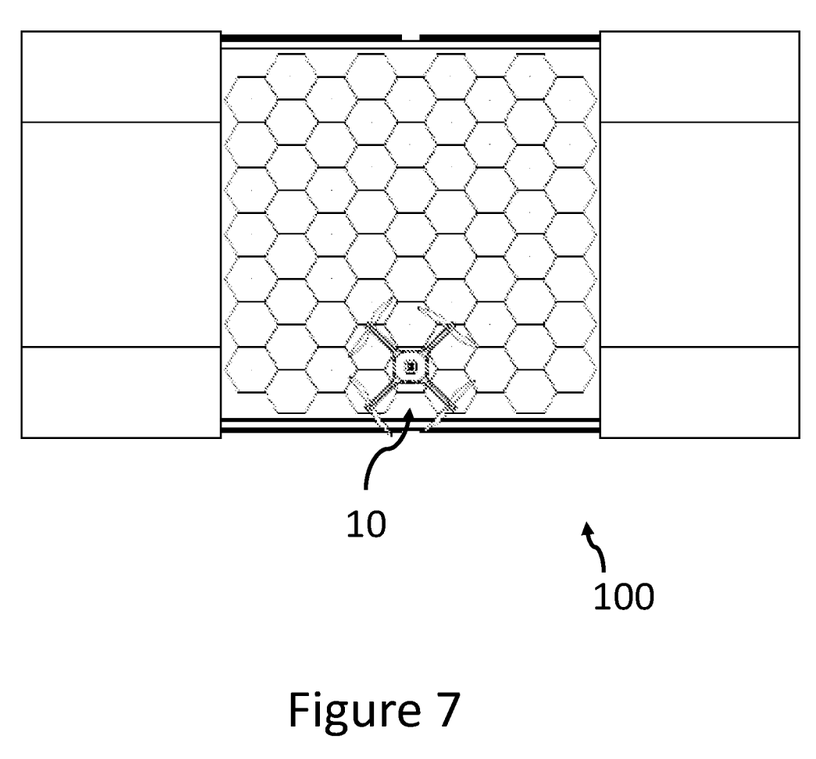
FIG. 7 is a top view of the drone box with the drone landed thereon on an unsafe location.

When any drone (10) lands on a drone box (100), an algorithm involving the unique address code of the ground interface (11) and the identification coordinates of the sensor zones (111) ascertains whether the drone has landed safely that is clear of all limiting boundaries (113) as shown in FIG. 6 or the drone (10) has landed unsafely as shown in FIG. 7. In the event the drone has landed unsafely, the drone (10) takes off and attempt another landing. In the event of a pre-decided numbers of unsuccessful attempts, a number of back up actions are initiated including prevention of movement of the platform covers (112), alarm/signal for manual intervention.

Once a drone has safely landed, the ground interface (11) facilitates charging of the batteries installed in the drone (10) via the sensor zones (11).

Figure 8:
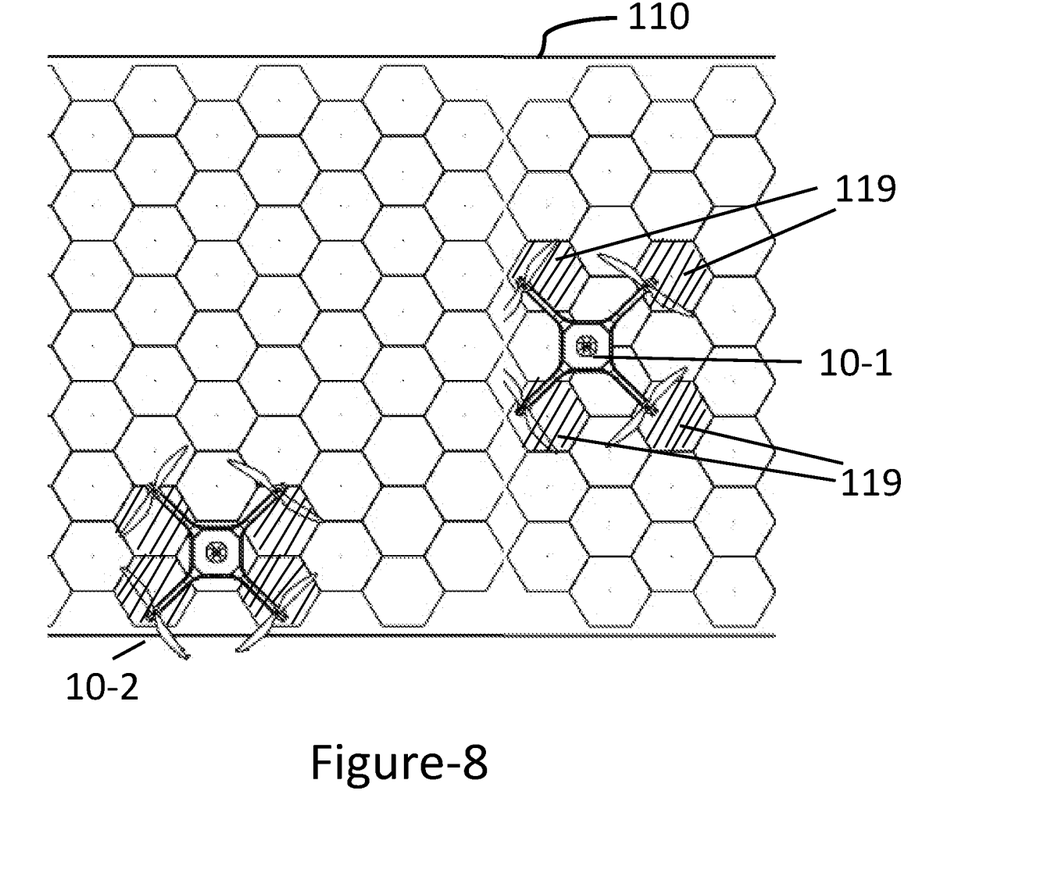
FIG. 8 is a top view of the drone platform with multiple drones landed and charging.

FIG. 8, charging of a first drone 10-1 and a second drone 10-2 having landed safely is described without limiting the invention to the description, as follows:

As the drone (10-1) lands safely, the sensor zones (111) sense the default polarity of Positive (+ve) and Negative (−ve) of the ground interfaces (11) of the first drone (10-1) and corresponding sensor zones (111 are activated with matching polarity so as to commence charging of batteries of the drone (10-1).

The identification coordinates of the activated sensor zones (119) are communicable to a second drone (10-2) so that the second drone (10-2) knows where NOT to land on the drone box. Such communication enables a third and subsequent drone (10-3, 10-4, . . . 10-*n*) to ascertain whether the identified drone box (100**) is suitable and available for landing.

Only sensor zones (111) occupied by a plurality of drones (10-1, 10-2, . . . 10-*n***) are activated so as to have highest safety and avoid loss of charge.

In the event that may arise due to a defect or localized obstruction, if any and all the sensor zones (111) fail to sense the default polarity of the Positive (+ve) and or the Negative (−ve) of the ground interfaces (11) in a prescribed time, the drone (10) switches the electrical polarity to another charging terminal (13).

A charging arrangement protects the system against over voltage, over current, reverse polarity and leakage current.

Once the drone (10) has safely landed, the drone (10) is protected by the platform covers (112).

The drone covers (112) are slidable or openable. The drone covers (112) are integrated on the drone box (100) or separately disposed.

We claim:

1. A system of unmanned aviation vehicles comprising the plurality of unmanned aviation vehicles capable of vertical landing and takeoff, the system communicating through a proprietary network or through GPS, WIFI and/or commercially available networks, and further comprising:
   at least a drone box (100) having
      a drone platform (110) with a plurality of limiting boundaries (113), made of a source transmitter (120) and a source receiver (121) with magnetic or optical line of sight radiation therebetween, and disposed along the limiting boundaries (113),
      the drone platform (110) divided into a number of sensor zones (111), that are mechanically contiguous and electrically separated by an insulated separator (114) of insulation width (115), each sensor zone (111) having identification coordinates,
      a levelled upper surface (117) of the drone platform (110),
      a plurality of platform covers (112), and
      at least two mounting dispositions (130) provided at a lower end of the drone box (100), each mounting disposition (130) manually adjustable in a longitudinal direction (131), and has a flexible cushion (135) at a free end (132) of the mounting disposition (130) capable of adjusting to an orientation commensurate with a surface of disposition (150),
   each unmanned aerial vehicle being a drone (10) having
      a plurality of ground interfaces (11), each ground interface (11) of each drone (10) having a unique address code, each ground interface (11) has a charging terminal (13) at a far end, each charging terminal (13) having an interlocked switchable electricity polarity positive (+ve) or negative (−ve) or neutral (N),
      a minimum terminal dimension (15) of the charging terminal (13) is such that a minimum contact area (14) is ensured when an axis (16) of the ground interface (11) of the drone (10) exactly coincides with a center of intersection (116) of the adjacent sensor zones (111), the ground interface (11) facilitates charging of batteries installed in the drone (10) via the sensor zones (111) after a safe landing of the drone (10).

2. The system of unmanned aviation vehicles as claimed in claim 1, wherein the flexible cushion is pneumatic/vacuum assisted.

3. The system of unmanned aviation vehicles as claimed in claim 1, wherein the flexible cushion is magnetic.

4. The system of unmanned aviation vehicles as claimed in claim 1, wherein the platform covers (112) are auto operable after ascertaining the plurality of drones (10-1, 10-2) landing clear of all the limiting boundaries (113) of the drone platform (110) created optically or magnetically sensing any physical object obstructing the line of sight radiation (122) of the source transmitter (120) and the source receiver (121).

5. The system of unmanned aviation vehicles as claimed in claim 1, wherein the interlocked switchable electricity polarity is switched by a programmable controller situated in the drone (10).

6. The system of unmanned aviation vehicles as claimed in claim 1, wherein each drone (10) has a default polarity of positive (+ve) and negative (−ve) on its any two charging terminals (13) of the ground interface (11).

7. The system of unmanned aviation vehicles as claimed in claim 1, wherein the drone (10), while air borne, ascertains and registers a precise position of the drone platform (110) of the drone box (100) in the vicinity by receiving a latitude and longitude of the drone (10) from a global positioning system, the drone (10) auto pilots its trajectory from its own dynamic position to the latitude and longitude of the landing platform, and the drone (10) vertically lands within a diameter less than twice its own envelope diameter (20).

8. The system of unmanned aviation vehicles as claimed in claim 1, wherein the drone (10), while air borne, ascertains and registers a precise position of the landing platform of the drone box in the vicinity by receiving a latitude and longitude of the drone (10) from a global positioning system, the drone (10) auto pilots its trajectory, in real time, from its own dynamic position to the dynamically varying latitude and longitude of a moving drone platform (110A).

9. The system of unmanned aviation vehicles as claimed in claim 1, wherein the drone (10) lands on a drone box (100) with an algorithm involving the unique address code of the ground interface (11) and the identification coordinates of the sensor zones (111) ascertaining a safe landing clear of all limiting boundaries (113).

10. The system of unmanned aviation vehicles as claimed in claim 1, wherein in the event the drone has landed unsafely, the drone (10) takes off and attempts another landing in an event of an unsafe landing unclear of limiting boundaries (113).

11. The system of unmanned aviation vehicles as claimed in claim 1, wherein the platform covers (112) are prevented from closing and an alarm/signal for manual intervention is initiated in the event of a pre-decided number of unsuccessful attempts.

12. The system of unmanned aviation vehicles as claimed in claim 1, wherein the sensor zones (111) sense the default polarity of positive (+ve) and negative (−ve) of the ground interfaces (11) of a first drone (10-1) and corresponding sensor zones (111) are activated with matching polarity so as to commence charging of batteries of the first drone (10-1).

13. The system of unmanned aviation vehicles as claimed in claim 12, wherein the first drone (10-1) activated certain sensor zones (111), the identification coordinates of the activated sensor zones (119) are communicable to a second drone (10-2) so that the second drone (10-2) knows where not to land on the drone box, such communication enables a third and subsequent drone (10-3, 10-4, . . . 10-*n*) to ascertain whether the identified drone box (100) is suitable and available for landing.

14. The system of unmanned aviation vehicles as claimed in claim 1, wherein the sensor zones (111) occupied by a plurality of drones (10-1, 10-2, . . . 10-*n*) are only activated.

15. The system of unmanned aviation vehicles as claimed in claim 1, wherein the drone (10) switches in a prescribed time the electrical polarity to another charging terminal (13), in the event any and all the sensor zones (111) failing to sense the default polarity of the positive (+ve) and or the negative (−ve) or the ground interfaces (11) of the landing drone (10).

16. The system of unmanned aviation vehicles as claimed in claim 1, wherein the drone box (100) has a charging arrangement protecting against over voltage, over current, reverse polarity and leakage current.

17. The system of unmanned aviation vehicles as claimed in claim 1, wherein the drone covers (112) are slidable or openable.

18. The system of unmanned aviation vehicles as claimed in claim 1, wherein the drone covers (112) are integrated on the drone box (100) or separately disposed.

\* \* \* \* \*